United States Patent [19]
Stapleton

[11] Patent Number: 5,886,899
[45] Date of Patent: Mar. 23, 1999

[54] METHOD FOR ANALYZING THE PERFORMANCE OF A MICROPROCESSOR

[75] Inventor: Warren G. Stapleton, San Jose, Calif.

[73] Assignee: Advanced Micro Devices, Austin, Tex.

[21] Appl. No.: 592,828

[22] Filed: Jan. 26, 1996

[51] Int. Cl.[6] .................................................. G06F 15/00
[52] U.S. Cl. ............................................ 364/490; 395/559
[58] Field of Search ..................................... 395/559, 704, 395/500, 183.09, 183.15, 184.01, 392, 394, 595, 596; 364/489, 490, 491

[56] References Cited

U.S. PATENT DOCUMENTS

| | | | |
|---|---|---|---|
| 4,763,289 | 8/1988 | Barzilai et al. | 364/578 |
| 5,179,672 | 1/1993 | Genduso et al. | 395/375 |
| 5,537,580 | 7/1996 | Giomi et al. | 395/500 |
| 5,666,288 | 9/1997 | Jones et al. | 364/490 |

OTHER PUBLICATIONS

Nagasamy et al., "Specification, Planning, and Synthesis in a VHDL Design Environment", 1992, pp. 58–68.

*Primary Examiner*—Dennis M. Butler
*Attorney, Agent, or Firm*—Skjerven, Morrill, MacPherson, Franklin & Friel LLP; Edward C. Kwok

[57] ABSTRACT

A method for analyzing the performance of a logic circuit driven by a clock signal, such as a microprocessor, identifies a number of operations of interest in a logic circuit and represents the presence of each of such operations by a different symbol. One or more of these symbols are output for perusal at the end of each clock period of operation. In one embodiment, this method is applied to a register transfer level (RTL) simulation of an execution unit of a microprocessor. In that embodiment, the execution sequence of multiple instructions executing simultaneously in the execution unit was analyzed. Because each output symbol represents a summary of a large number of activities that occur in a single clock period of operation or simulation of a complex logic circuit, these symbols can be tabulated in a format that allows a designer of the complex logic circuit to easily spot an unexpected pattern of operation, or an error condition.

5 Claims, 5 Drawing Sheets

```
// Retire Pattern;
char RetireChar = ' ';
if (ERETRetire) {
  if (CHP.SC.BrAbort && !CHP.SC.ExcpAbort &&
      !CHP.SC.OpQuads [5] .Emcode) {  // MacDec Conditional Br Abort;
    if (Cycle > 0) {
      RetireChar = char('a' + MacroInstrPerQuad - 1) ;
    }
    else {
      RetireChar = ',';
    }
  }
  else {      // "Normal" Retire;
    if (CHP.SC.OpQuads [5] .Emcode) { // Emcode ERET OpQuad;
      RetireChar = CHP.SC.OpQuads [5] .IncNearRet ? ']' : '!' ;
    }
    else if (!CHP.SC.OpQuads [5] .ShortDecOpQuad) { //  Long Decode OpQuad;
      RetireChar = 'l';
    }
    else {
      if (!CHP.SC.OpQuads [5] .ShortDecCallXC) {
        RetireChar = char ('0' + MacroInstrPerQuad);
      }
      else {
        switch (MacroInstrPerQuad) {
          case 1:
            RetireChar = '[';
            break;
          case 2:
            RetireChar = '(';
            break;
          case 3:
            RetireChar = '<';
            break;
          default:
            error ("PIPE: Bad Value for MacroInstrPerQuad: ",
                   MacroInstrPerQuad);
        }
      }
    }
  }
}
// Not ERETRetire;
else if (CHP.SC.OpQRetire && CHP.SC.OpQuads [5] .OpQV &&
         CHP.SC.LdEntry5) {           // Emcode non ERET OpQuad;
  RetireChar = '_';
}
else if (CHP.SC.BrAbort) {            // Emcode Branch Abort;
  RetireChar = '#';
```

| FIG. 3A |
| FIG. 3B |

FIGURE 3A

```
}
else {
   RetireChar = CHP.SC.OpQuads [5] .OpQV ? '·' : ' ';
}

// Spit it out;
if (RetireToScreen) {
   cerr << RetireChar;
}
if (Retire) {
   RetireFile << RetireChar;
}
```

| FIG. 4A |
|---|
| FIG. 4B |

METHOD FOR ANALYZING THE PERFORMANCE OF A MICROPROCESSOR

CROSS REFERENCE TO APPENDIX INCLUDING A COMPUTER PROGRAM LISTING

Appendix A, which is a part of the present disclosure, is an appendix consisting of 1 sheet of listing of a computer program and related data in one embodiment of this invention. This listing of computer programs contains material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

This invention relates to computer system performance analysis. In particular, this invention relates to analyzing performance of a microprocessor which executes multiple instructions simultaneously.

2. Discussion of the Related Art

A relatively recent architecture for microprocessors, known as the "superscaler" architecture, enables multiple instructions to be executed in the microprocessor in parallel. By allowing parallel execution of multiple instructions, very high processing speed can be achieved. For at least two reasons, however, most programs designated to run on such microprocessors are still written as a sequence of instructions expected to be executed in a prescribed order. First, most high level programming languages favored by the majority of programmers are semantically primarily sequential, i.e. such programming languages provide no construct to allow the programmer to designate parallel execution. Second, inherent data dependency exists in any algorithm, such that certain operations are required to be carried out in a prescribed sequence in order to yield the correct result. Thus, an important challenge in a superscaler design is to provide a scheduling mechanism whereby the multiple instructions that are executed in parallel do so in such a manner that the correct result is obtained, even though some instructions may be executed completely out of order.

Clearly, to ensure that the complex logic circuit that controls and schedules instruction execution in a superscaler microprocessor is operating correctly, it is desirable to be able to trace and to debug the complex execution sequences expected to be occurring in such a microprocessor. Further, during the development of a microprocessor, the ability to accurately analyze the performance of a given circuit architecture is important to help the designer make design decisions. Such performance analysis is impossible without a tool which allows good visibility into the complex operations of such a microprocessor. Such a tool can be used in analyzing other complex logic circuits, in addition to the use discussed above.

SUMMARY OF THE INVENTION

The present invention provides a method for analyzing the performance of a logic circuit driven by a clock signal, such as a microprocessor. The method of the present invention typically begins by identifying a number of operations of interest in the logic circuit. Then, in an operative model of the logic circuit, for each of the operations identified, a status signal is selected or created. This status signal, when asserted, represents a selected status of the identified operation. If the condition that a selected group of the status signals are asserted is of interest, a symbol is then associated with such a condition. Each group of status signals involved in the condition can include one or more of the status signals. A large number of conditions, each representing a different group of status signals being asserted, are each associated with a different symbol. The operative model of the logic circuit can then be operated (e.g. in a simulation), for the purpose of performance analysis, for a number of clock periods. At the end of each clock period, an appropriate one of the selected symbol is output, to indicate the occurrence of the condition encoded in the symbol.

In one embodiment of the present invention, the operative model used is a register transfer level (RTL) simulation model of the execution unit of a microprocessor. In that embodiment, multiple instructions are executed in the execution unit simultaneously. Numerous symbols are associated, in that embodiment, to encode conditions of interest. The symbols are printed on a report for analysis.

The present invention thus provides, in a single symbol, a summary of a large number of activities that occur during a single clock cycle of operation or simulation of a complex logic circuit. The symbols of a large number of clock cycles can be tabulated in a format that allows a designer of the complex logic circuit to easily spot an unexpected pattern of operation, or an error condition. Thus, the present invention is extremely useful to the designer for evaluating different design decisions, or to debug a design.

The present invention is better understood upon consideration of the detailed description below and the accompanying drawings.

BRIEF DESCRIPTION OF THE DRAWINGS

FIG. 3 is an example of a performance monitor program implementing flow chart 200 of FIG. 2.

FIG. 4 is an exemplary output listing 400 of the performance monitor program of FIG. 3 in one simulation of an execution unit of a superscaler microprocessor.

DETAILED DESCRIPTION OF THE PREFERRED EMBODIMENTS

The present invention allows an instruction execution sequence in a microprocessor to be reported for performance analysis. The present invention is applicable to the execution unit of a microprocessor, such as the superscaler microprocessor described in the copending patent application (the "First Copending Application"), entitled "Out-of-order Execution Engine for Microprocessor" by John G. Favor et al., filed on the same date as the present application, U.S. application Ser. No. 08/590,383, assigned to Advanced Micro Systems, Inc, which is also the assignee of the present invention. The First Copending Application is hereby incorporated by reference in its entirety.

The present invention is described in this detailed description, by way of example, using a register transfer level (RTL) description of an execution unit in a microprocessor, which is used for simulation purpose during a development phase of the microprocessor. The present invention, however, is not limited to application in such an RTL simulation. For example, the present invention can be incorporated in a hardware description language (HDL) level simulation, or even implemented in the integrated circuit form to allow run-time performance probing of the microprocessor. All these variations are deemed within the scope of the present invention.

The RTL model of the present invention is expressed in the C++ programming language, according to a method disclosed in copending patent application (the "Second Copending Application"), U.S. application Ser. No. 08/592,041, entitled "Design for a Simulation Module Using an Object-Oriented Programming Language" by Warren G. Stapleton, filed on the same day as the present application, and assigned to Advanced Micro Systems, Inc., which is also the assignee of the present patent application. The specification of the Second Copending Application is hereby incorporated by reference.

As discussed in the First Copending Application incorporated by reference above, the microprocessor of the present embodiment executes a sequence of x86[1] instructions ("macroinstructions") by converting each macroinstruction into one or more operations ("RISC instructions") executable by an execution "engine". This execution engine can be loosely referred to as a "reduced instruction set computing" (RISC) processor.

The x86 instruction set is an instruction set executable by microprocessors compatible with microprocessors in the 8086, 80286, 80386, 80486, Pentium, Pentium Pro families of microprocessors available from Intel Corporation, Santa Clara, Calif.

Figure 1:
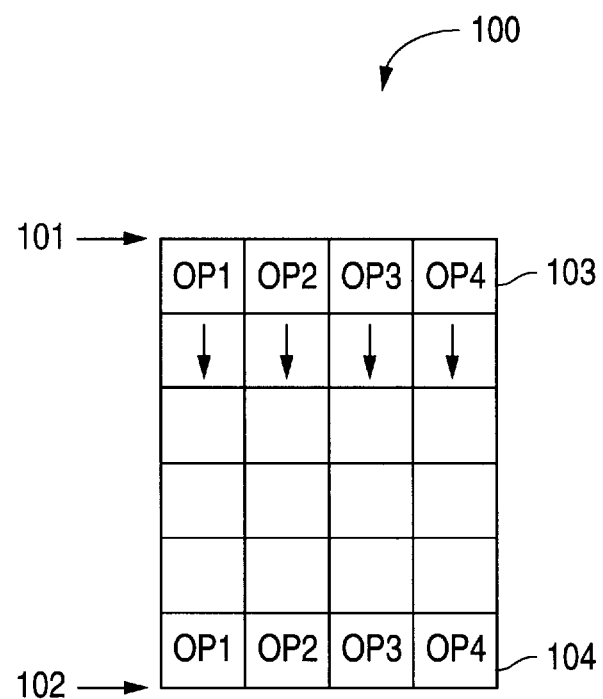
FIG. 1 shows the scheduler's queue 100 in one embodiment of the present invention.

In the present embodiment, the execution engine has seven units which can execute RISC instructions in parallel. RISC instructions are scheduled in fours ("OpQuads") by a scheduler. These RISC instructions can be scheduled "out of order", i.e. RISC instructions converted from an earlier macroinstruction need not necessarily be executed ahead of RISC instructions converted from a later macroinstruction. In addition, a RISC instruction can be "speculatively" executed, in the sense that its results may eventually be discarded as not being needed (e.g. a conditional branch instruction), or it is issued, i.e. allowed to proceed, even though the input data upon which the RISC instruction relies can be changed subsequent to issuance by another simultaneously executing RISC instruction. In this embodiment, the scheduler maintains a 6-OpQuad deep queue. This queue is illustrated by queue 100 shown in FIG. 1. An OpQuad, indicated generally in FIG. 1 by reference numeral 103, consists of four RISC instructions, which are generally indicated by the identifiers OP1-OP4. The RISC instructions are issued by the scheduler when loaded as an OpQuad into the head ("loading end") of queue 100, which is indicated by pointer 101 in FIG. 1, and are "retired" from the tail ("unloading end") 102 of queue 100. An OpQuad is retired when the results of each of all four RISC instructions are "committed". As OpQuads are retired from unloading end 102 of queue 100, OpQuad 103 proceeds towards unloading end 102 of queue 100.

Commitment, which is handled by a functional unit known as the "Operation Commit Unit" (OCU), refers to the process of making the results of a RISC instruction permanent. Commitment occurs, for example, when a result is written into a general purpose register of the microprocessor, when a status flag visible to the macroinstruction programmer is changed, or when a result is written into the portion of the main memory visible to the macroinstruction programmer.

Under the rules disclosed in the First Copending Application, all RISC instructions that proceed to unloading end 102 of scheduler's queue 100 is eventually retired. Any RISC instruction found to be invalid, e.g. an incorrect branch prediction, is invalidated prior to its OpQuad proceeding to unloading end 102 of scheduler's queue 100. In the present embodiment, the scheduler can bump or remove an executing RISC instruction from further execution. For example, an instruction which unduly blocks other RISC instructions in a pipeline for too many cycles can be removed from the pipeline and be reissued at a later time. In addition, even though the goal is to retire an OpQuad every processor cycle, an OpQuad at unloading end 102 of scheduler's queue 100 may remain for more than one cycle.

Clearly, therefore, the execution sequence of RISC instructions in the microprocessor of the present embodiment, for any given macroinstruction program, cannot be predicted easily. The present invention allows the reporting of activities in the microprocessor by making available to a performance analysis tool, at the end of each processor cycle, a number of status flags indicating occurrences of designated events during that processor cycle.

In the present embodiment, the present invention is applied to an RTL model simulation of the microprocessor. The RTL model of the OCU unit reports, at the end of each simulated processor cycle, in a number of status flags, the nature of any retirement of an OpQuad during the processor cycle, or that no OpQuad is retired during that processor cycle. In addition, in an object of the class CHP-.SC.OpQuads, the scheduler includes a number of status flags indicating the nature of RISC instructions issued in an OpQuad. In this embodiment, CHP.SC.OpQuads[5] describes the OpQuad at unloading end 102 of queue 100. The control program for the RTL model simulation then invokes a performance monitor program to summarize the reported status flags to provide a concise report which is specifically formatted in such a manner that a human designer can easily peruse to spot any unexpected event or abnormality in the execution The RTL model used in the present embodiment is provided for reference as Appendix A. In the present embodiment, the following status flags are provided:

ERETRetire—this flag indicates that an ERET[2] type Emcode is retired;

CHP.SC.OpQuads[5].Emcode—this flag indicates that the OpQuad retired includes an Emcode;

CHP.SC.BrAbort and CHP.SC.ExcpAbort—these flags, together with CHP.SC.OpQuads[5].Emcode, indicate that a macroinstruction conditional branch is aborted in the processor cycle of interest;

CHP.SC.OpQuad[5].IncNearRet—this flag indicates retirement of an OpQuad including an RISC instruction representing a near RET macroinstruction;

CHP.SC.OpQuad[5].ShortDecOpQuad—this flag indicates that a "short decode"[3] instruction is represented in the OpQuad;

MacroinstrPerQuad—this flag indicates the number of short decode instructions represented in the OpQuad;

CHP.SC.OpQuads[5].ShortDecCallXC—this flag indicates that a near CALL macroinstruction is represented in the OpQuad;

CHP.SC.OpQuads[5].OpQV—this flag indicates that the current OpQuad is valid; and CHP.SC.OpQRetire and CHP.SC.LdEntry5—these flags, together with CHP.SC.OpQuads[5].OpQV and ERETRetire, indicate a non-ERET OpQuad.

In the present embodiment, certain macroinstructions are decoded from a read-only memory (ROM), rather than by a logic circuit. RISC instructions originated from the ROM are referred to as Emcodes. ERET is a category of Emcodes used in the present embodiment.

In the present embodiment, if a macroinstruction is converted to less than 4 RISC instruction, such a macroinstruction is referred to as a "short decode" instruction. Otherwise, such macroinstruction is referred to as a "long decode" instruction.

Figure 2:
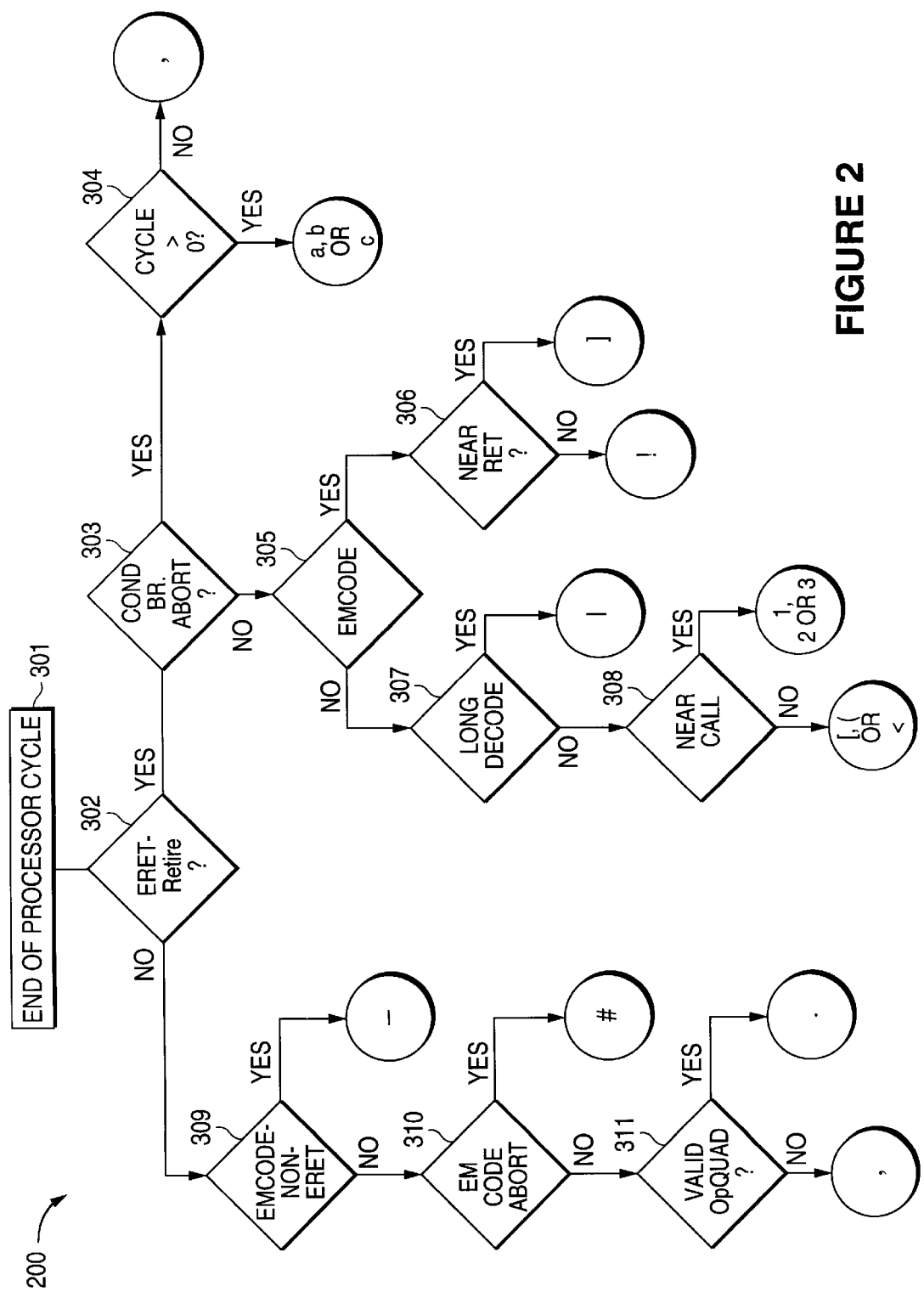
FIG. 2 is a flow chart 200 of a performance monitor program which is one embodiment of the present invention.

FIG. 2 is a flow chart 200 of a performance monitor program which is an exemplary embodiment of the present invention. As shown in FIG. 2, the performance monitor program is invoked at step 301, when a simulated processor cycle completes. The performance monitor program checks, at decision point 302, whether an OpQuad containing an ERET type Emcode is retired. If an ERET type Emcode is retired, decision point 303 is reached. At decision point 303, the performance monitor program examines if a RISC instruction representing a conditional branch macroinstruction was aborted during the processor cycle. If such a RISC instruction is aborted, the performance monitor examines a variable cycle at decision point 304. If cycle equals 0, the performance monitor program outputs a ',' character to indicate that an invalid OpQuad is retired. Otherwise, i.e. if cycle is greater than 0, the performance monitor program outputs one of characters 'a', 'b' and 'c', depending on whether zero, one or two "short decode" instructions are represented in the OpQuad.

If, at decision point 303, it is determined that a RISC instruction representing a conditional branch macroinstruction was not aborted, the performance monitor program examines, at decision point 305, if the retired OpQuad includes an Emcode type RISC instruction. If the retired OpQuad includes an Emcode type RISC instruction, the performance monitor program outputs a ']' or a '!' character, depending upon whether or not a RISC instruction representing a "near RET" type macroinstruction is included in the OpQuad. If, however, the retired OpQuad is determined, at decision point 305, not to include an Emcode type RISC instruction, the performance monitor examines, at decision point 307, whether the RISC instructions in the retired OpQuad represent a "long decode" type macroinstruction. If so, the performance monitor program outputs a '|' character. Otherwise, the performance monitor program examines, at decision point 308, whether the RISC instructions in the OpQuad represent a "near Call" type macroinstruction. If the RISC instructions in the OpQuad represent a "near Call" type macroinstruction, the performance monitor program outputs the character '1', '2' or '3', depending upon whether one, two, or three "short decode" type macroinstructions are represented in the OpQuad. If, at decision point 308, the RISC instructions in the OpQuad are determined not to be resulting from a "near Call" type macroinstruction, the performance monitor outputs the '[', '(' or '<', depending upon whether one, two or three "short decode" type macroinstructions are represented in the OpQuad.

If, however, it is determined, at decision point 302, that an ERET type Emcode RISC instruction is not retired, at decision point 309, the performance monitor determines if a non-ERET type Emcode RISC instruction is retired. If so, a '—' is output. Otherwise, at decision point 310, the performance monitor examines if an Emcode instruction is aborted in the simulated processor cycle. If so, the performance monitor program outputs a '#' character; otherwise, the performance monitor program outputs a '.' or a ',' character, depending upon whether the OpQuad retired is a valid OpQuad (decision point 311).

Figures 3B, 4A, 4B:
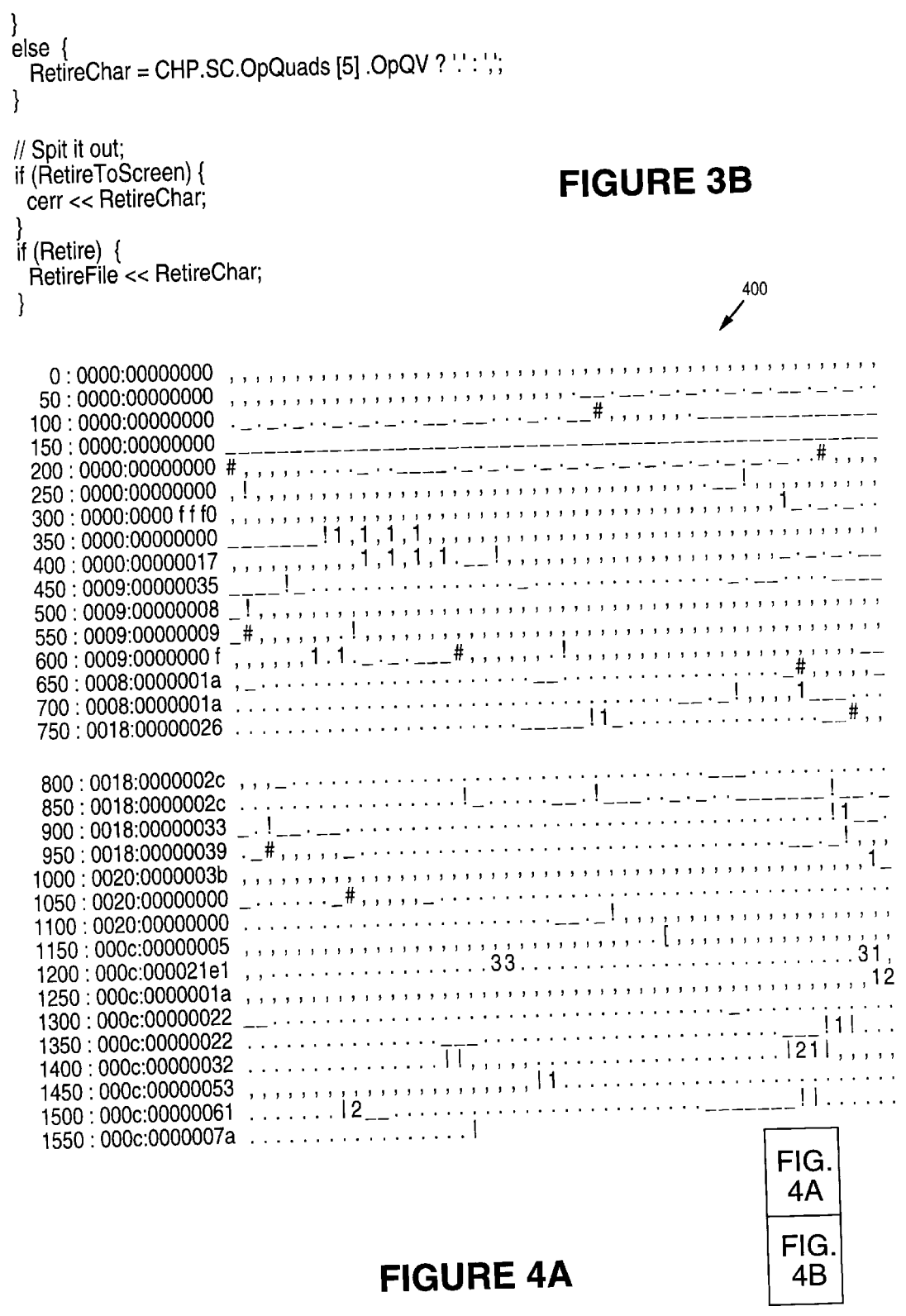
Figure 4B:
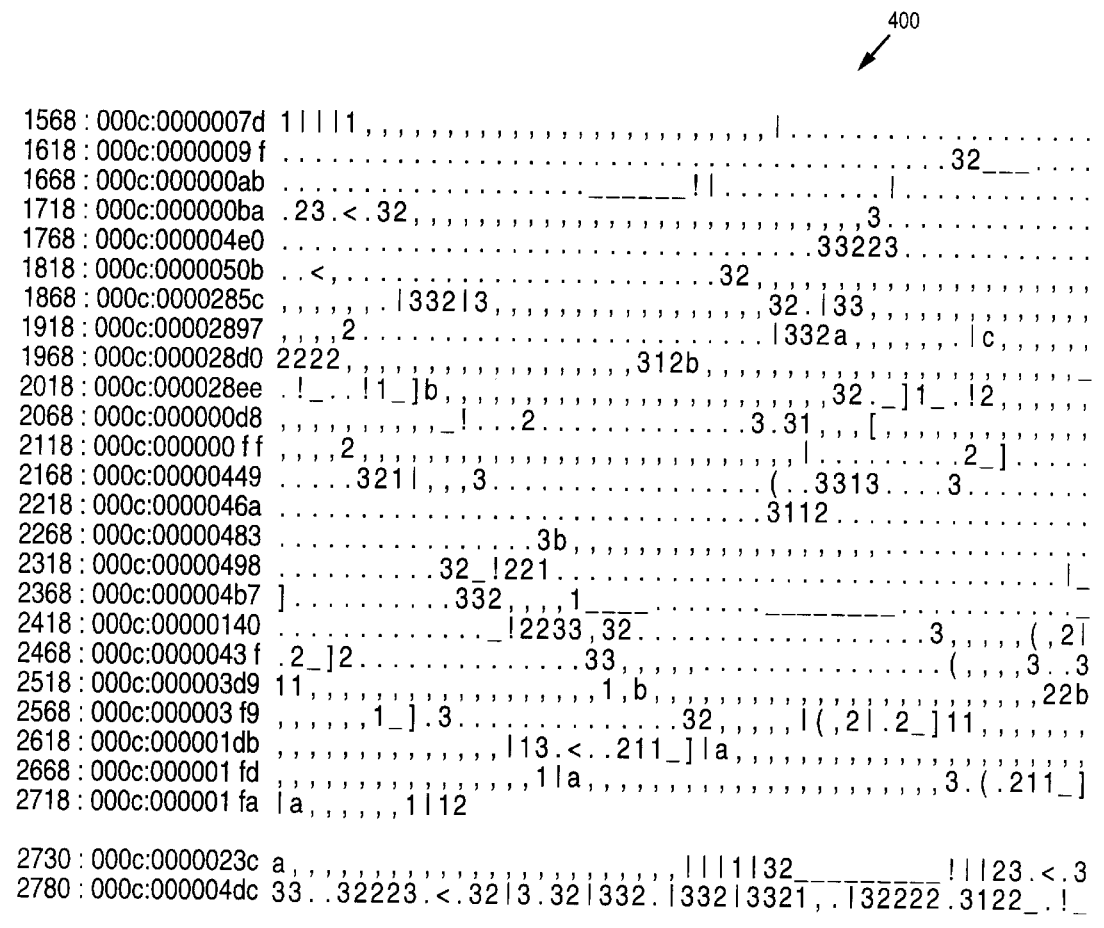

FIG. 3 is an example of a performance monitor program implementing flow chart 200 of FIG. 2. FIG. 4 is an exemplary output listing 400 of the performance monitor program of FIG. 3 in one simulation of the operations of a superscaler microprocessor. In FIG. 4, on each line of output listing 400, it is provided on the first and second columns, corresponding to the first output character of the line, the simulated processor cycle number and the value of the macroinstruction program counter. Following the first and second columns are fifty single character columns, corresponding to the fifty output characters of the performance monitor program during the fifty simulated processor cycles reported in that line. Output listing 400 is therefore a concise summary of the activities in the superscaler microprocessor over a large number of simulated processor cycles. Further, since each character encodes a complex condition of interest, the trained designer can easily spot from output listing 400 any extraordinary or unexpected patterns representing extraordinary or unexpected operating conditions of the microprocessor. Such information is extremely important to the designer making design decisions or debugging the design of the microprocessor.

The present invention is applicable to the design of such computer systems as those described in the following copending U.S. patent applications, which are hereby incorporated into the present patent application by reference:

1. U.S. patent application, entitled "Unified Multi-function Operation Scheduler for Out-of-order Execution in a Superscaler Processor", by John G. Favor et al., U.S. application Ser. No. 08/590,383, filed on the day as the present application, assigned to Advanced Micro Devices, Inc.

2. U.S. patent application, entitled "Out-of-order Processing with Operation Bumping to Reduce Pipeline Delay", by John G. Favor et al., U.S. application Ser. No. 08/590,568, filed on the same day as the present application, assigned to Advanced Micro Devices, Inc.

3. U.S. patent application, entitled "Scan Chain for Rapidly Identifying First or Second Objects of Selected Types in a Sequential List", by John G. Favor et al., U.S. application Ser. No. 08/592,722, filed on the same day as the present application, assigned to Advanced Micro Devices, Inc.

4. U.S. patent application, entitled "Self-Modifying Code Handling System", by Amos Ben-Meir et al., U.S. application Ser. No 08/592,150, filed on the same day as the present application, assigned to Advanced Micro Devices, Inc.

5. U.S. patent application, entitled "Out-of-order Load/Store Execution Control", by John G. Favor et al., U.S. application Ser. No. 08/592,209, filed on the same day as the present application, assigned to Advanced Micro Devices, Inc.

6. U.S. patent application, entitled "Two Way Encoding Branching Method and System", by John G. Favor et al., U.S. application Ser. No. 08/592,210, filed on the same day as the present application, assigned to Advanced Micro Devices, Inc.

7. U.S. patent application, entitled "Instruction Vectoring and Decode", by John G. Favor et al., U.S. application Ser. No 08/592,208, filed on the same day as the present application, assigned to Advanced Micro Devices, Inc.

8. U.S. patent application, entitled "RISC 86 Instruction Set", by John G. Favor et al., U.S. application Ser. No. 08/592,151, filed on the same day as the present application, assigned to Advanced Micro Devices, Inc.

9. U.S. patent application, entitled "Software Implementation of SMM", by John G. Favor et al., U.S. application Ser. No. 08/592,149, filed on the same day as the present application, assigned to Advanced Micro Devices, Inc.

10. U.S. patent application, entitled "Method For Simulating Cache Operation", by Warren G. Stapleton, U.S. application Ser. No. 08/592,829, filed on the same day as the present application, assigned to Advanced Micro Devices, Inc.

11. U.S. patent application, entitled "Instruction Predecode and Multiple Instruction Decode", by John G. Fervor et al., U.S. application Ser. No. 08/592,207, filed on the same day as the present application, assigned to Advanced Micro Devices, Inc.

12. U.S. patent application, entitled "Instruction Buffer Organization Method and System", by John G. Fervor et al, U.S. application Ser. No. 08/593,765, filed on the same day as the present application, assigned to Advanced Micro Devices, Inc.

The above detailed description is provided to illustrate the specific embodiments of the present invention and is not intended to be limiting. Numerous modifications and variations within the scope of the present invention are possible. The present invention is defined by the following appended claims.

APPENDIX A

```
uint NumberOfShortDecodes =
    (CHP.DEC.SDec0V_W && !CHP.DEC.SDec0Prfx_W) +
    (CHP.DEC.SDec1V_W && !CHP.DEC.SDec1Prfx_W);
OpQuads[0].MacroInstrPerQuad =
    (CHP.DEC.SDec0V_W && !CHP.DEC.EmcMode_R && !CHP.DEC.ExcpDetect_R) ?
    NumberOfShortDecodes : 1;
OpQuads[0].ShortDecCallXC = CHP.DEC.DecCallXC_W;
OpQuads[0].ShortDecOpQuad = CHP.DEC.SDec0V_W;
uint ExtEmcSourceLineNumber;
uint ExtEmcIncNearRet;
uint ExtEmcIncMispredictedNearRet;
uint ExtEmcNoEretRetire;
if (CHP.DEC_ExtEmc) {
    HEmcodeOpQuad ExtEmcQuad =
        CHP.ERM.Emcode_R.getOpQuad(HVector(CHP.IC.ICEmcFetchAddr(13,2)));
    ExtEmcSourceLineNumber = SMIIO ? 0x0 : ExtEmcQuad,SourceLineNumber;
    ExtEmcIncNearRet = SMIIO ? 0 : ExtEmcQuad,IncNearRet;
    ExtEmcIncMispredictedNearRet =
        SMIIO ? 0 :ExtEmcQuad.IncMispredictedNearRet;
    ExtEmcNoEretRetire = SMIIO ? 0 : ExtEmcQuad,NoEretRetire;
}
OpQuads[0].SourceLineNumber =
    DEC_OpQSelE ?
    (CHP.DEC_ExtEmc ?
    ExtEmcSourceLineNumber : DEC_DecOrEDROpQuad_I.SourceLineNumber) : 0;
OpQuads[0].EmcFetchAddr =
    DEC_OpQSelE ?
    (CHP.DEC_ExtEmc ? CHP.IC.ICEmcFetchAddr : CRP.ERM_EmcFetchAddr) : 0;
OpQuads[0].IncNearRet =
    DEC_OpQSelE ? (CHP.DEC_ExtEmc ? ExtEmcIncNearRet
                                  : DEC_DecOrEDROpQuad_I.IncNearRet)
                : 0;
OpQuads[0].IncMispredicteNearRet =
    DEC_OpQSelE ?
        (CHP.DEC_ExtEmc ? ExtEmcIncMispredictedNearRet
                        : DEC_DecOrEDROpQuad_I.IncMispredictedNearRet) : 0;
OpQuads[0].NoEretRetire =
    DEC_OpQSelE ? (CHP.DEC_ExtEmc ? ExtEmcNoEretRetire
                                  : DEC_DecOrEDROpQuad_I.NoEretRetire)
                : 0;
OpQuads[0].BTBLookUp =
    DEC_OpQSelE ? 0 : CHP.DEC.DecTakenXC_W;
OpQuads[0].BTBMiss =
    DEC_OpQSelE ? 0 : (CHP.DEC.DecTakenXC_W && !CHP.DEC.BtbHit_W);
```

I claim:

1. A method for analyzing the performance of a logic circuit driven by a clock signal, comprising the steps of:

identifying a number of operations of interest in said logic circuit, said logic circuit being an execution unit of a microprocessor;

for each of said operations, creating in an operative model of said logic circuit a status signal, said status signal, when asserted, being representative of a status of said operation;

associating a symbol to represent the condition in which a selected group of said status signals are asserted, said group including one or more of said status signals;

operating said operative model of said logic circuit a predetermined number of periods of said clock signal; and outputting said symbol whenever said condition occurs at the end of each of said periods of said clock signal.

2. A method as in claim 1, wherein said operative model is a register transfer level (RTL) model of said logic circuit.

3. A method as in claim 1, wherein said execution unit executes multiple instructions of said microprocessor in parallel.

4. A method as in claim 3, wherein said operations of interest include the commitment of a result in the execution of said multiple instructions of said microprocessor.

5. A method as in claim 1, wherein said step of outputting said symbol outputs said symbol on a printed report.

* * * * *